(12) United States Patent
Braun

(10) Patent No.: US 9,547,022 B2
(45) Date of Patent: Jan. 17, 2017

(54) METHOD AND SYSTEM FOR VEHICLE DIRECTION DETERMINATION USING ADJUSTABLE POSITION ACCELEROMETER

(71) Applicant: Trapeze Software ULC, Mississauga (CA)

(72) Inventor: Bradley Kenneth Braun, Calgary (CA)

(73) Assignee: TRAPEZE SOFTWARE ULC, Mississauga (CA)

( * ) Notice: Subject to any disclaimer, the term of this patent is extended or adjusted under 35 U.S.C. 154(b) by 0 days.

(21) Appl. No.: 14/212,627

(22) Filed: Mar. 14, 2014

(65) Prior Publication Data

US 2015/0260753 A1    Sep. 17, 2015

(51) Int. Cl.
*G01P 15/18* (2013.01)
*G01C 21/16* (2006.01)

(52) U.S. Cl.
CPC ............... *G01P 15/18* (2013.01); *G01C 21/16* (2013.01)

(58) Field of Classification Search
CPC .................................. G01P 15/18; G01C 21/16
USPC ........................................................... 701/512
See application file for complete search history.

(56) References Cited

U.S. PATENT DOCUMENTS

| | | |
|---|---|---|
| 5,353,023 A | 10/1994 | Mitsugi |
| 7,813,851 B2 | 10/2010 | DeMersseman et al. |
| 8,630,768 B2 | 1/2014 | Mcclellan et al. |
| 2006/0208169 A1 | 9/2006 | Breed et al. |
| 2013/0081442 A1* | 4/2013 | Basir ...................... G01P 21/00 73/1.38 |
| 2013/0166099 A1 | 6/2013 | Van Den Bergh |

* cited by examiner

*Primary Examiner* — Brian P Sweeney
(74) *Attorney, Agent, or Firm* — Elan IP Inc.

(57) ABSTRACT

Systems and methods for determining, for a vehicle using an adjustable position accelerometer, at least one direction tuned direction vector indicating a direction for the vehicle, the direction tuned direction vector made up of an X(a) axis component, a Y(a) axis component, and a Z(a) axis component, the adjustable position accelerometer providing acceleration values, the values made up of an X(a) axis component, a Y(a) axis component, and a Z(a) axis component, where the accelerometer is arbitrarily mounted, and optionally movable, in the vehicle such that each of the X(a) axis component, a Y(a) axis component, and a Z(a) axis component may be partially in X,Y, and Z directions of the vehicle.

5 Claims, 7 Drawing Sheets

Vehicle direction
Z = up, Y = forward, X = sideways (lateral)

Accelerometer direction
Z(a) = up, Y(a) = forward, X(a) = sideways (lateral)

METHOD AND SYSTEM FOR VEHICLE DIRECTION DETERMINATION USING ADJUSTABLE POSITION ACCELEROMETER

FIELD OF THE INVENTION

The present invention relates generally to vehicle direction determination and more particularly, the present invention relates to a method and system for direction determination using adjustable position accelerometers that ensures the determined directions of the accelerometer's acceleration is coaxial with the acceleration of the vehicle.

BACKGROUND OF THE INVENTION

Accelerometers are often used in vehicles, or in mobile data terminals that are removably attached in vehicles, to monitor acceleration in one or more directions—typically including at least a forward direction. This monitoring may be used to evaluate such things as driver performance, vehicle performance, vehicle wear and tear, and the like.

Although many accelerometers are mounted in vehicles in such a way that the accelerometer's axes are either concentric with the vehicle's axes, or are predictably related thereto. However, in some situations it has proven to be beneficial to allow the accelerometers to be movable, resulting in their axes having a changing relationship to the axes of the vehicle whose acceleration they are monitoring. This can cause errors in the acceleration values the accelerometer is attributing to the vehicle.

There is thus a need for adjustable position accelerometers direction determination.

SUMMARY OF THE INVENTION

There is a method for determining, for a vehicle using an adjustable position accelerometer, at least one direction tuned direction vector indicating a direction for the vehicle, the direction tuned direction vector made up of an X(a) axis component, a Y(a) axis component, and a Z(a) axis component, the adjustable position accelerometer providing acceleration values, the values made up of an X(a) axis component, a Y(a) axis component, and a Z(a) axis component, where the accelerometer is arbitrarily mounted, and optionally movable, in the vehicle such that each of the X(a) axis component, a Y(a) axis component, and a Z(a) axis component may be partially in X,Y, and Z directions of the vehicle, where +Y is a forward direction of the vehicle, the method comprising:
collecting an accelerometer value comprising an X(a) axis component, a Y(a) axis component, and a Z(a) axis component;
  creating a sample direction vector of values from the collected accelerometer value; calculating a direction tuned direction vector for +Y direction comprising an X(a) axis component, a Y(a) axis component, and a Z(a) axis component, from the sample direction vector.
The method may further comprise:
  collecting a first set of accelerometer values, creating a second set of sample direction vectors from the first set of accelerometer values and calculating the direction tuned direction vector by averaging the sample direction vectors from the second set of sample direction vectors.

The method wherein the collecting may further comprise:
  receiving a trigger to perform the collecting, the trigger indicating that the vehicle is moving in a +Y or −Y direction.
The method wherein the trigger is a manual trigger.
There is also a method for determining, for a vehicle using an adjustable position accelerometer, at least one direction tuned direction vector indicating a direction for the vehicle, the direction tuned direction vector made up of an X(a) axis component, a Y(a) axis component, and a Z(a) axis component, the adjustable position accelerometer providing acceleration values, the values made up of an X(a) axis component, a Y(a) axis component, and a Z(a) axis component, where the accelerometer is arbitrarily mounted, and optionally movable, in the vehicle such that each of the X(a) axis component, a Y(a) axis component, and a Z(a) axis component may be partially in X,Y, and Z directions of the vehicle, where +Y is a forward direction of the vehicle, the method comprising:
  monitoring the values;
  determining if at least one of the X(a) axis component, the Y(a) axis component, or the Z(a) axis component exceeds a threshold;
  if the threshold is exceeded then:
    ensuring the threshold continues to be exceeded during a collection period; and
    collecting accelerometer values, at a collection frequency for a collection period;
  creating a sample direction vector of values from the collected accelerometer values;
  inserting the sample direction vector to a set of sample direction vector; and
  calculating at least one direction tuned direction vector from the set of sample direction vectors.
The method wherein the calculating occurs only if the set of sample direction vectors includes at least a sample threshold number of sample direction vectors.
The method may further comprise:
  obtaining further values;
  assessing a vehicle acceleration of the vehicle using the direction tuned direction vector and the further values.
The method where the assessing comprises taking the dot product of the direction tuned direction vector and the further values.
The method may further comprise:
  providing the vehicle acceleration for further analysis based on a set of rules.
There is also a method for ensuring acceleration data, from an adjustable position accelerometer on a vehicle, is reliable for use in assessing a vehicle, the method comprising:
  collecting, for the vehicle, accelerometer readings from an adjustable position accelerometer;
  receiving a request to communicate the accelerometer readings;
  checking whether the accelerometer readings are direction tuned; and
  if the accelerometer readings are direction tuned then:
  communicating the accelerometer readings.
The method wherein the accelerometer readings are direction tuned if at least one direction tuned direction vector is known and has been applied to the accelerometer readings.
The method of claim 5 further comprising:
  if the accelerometer values are not direction tuned then:
  communicating the accelerometer values and an indicator that the accelerometer values are not direction tuned.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
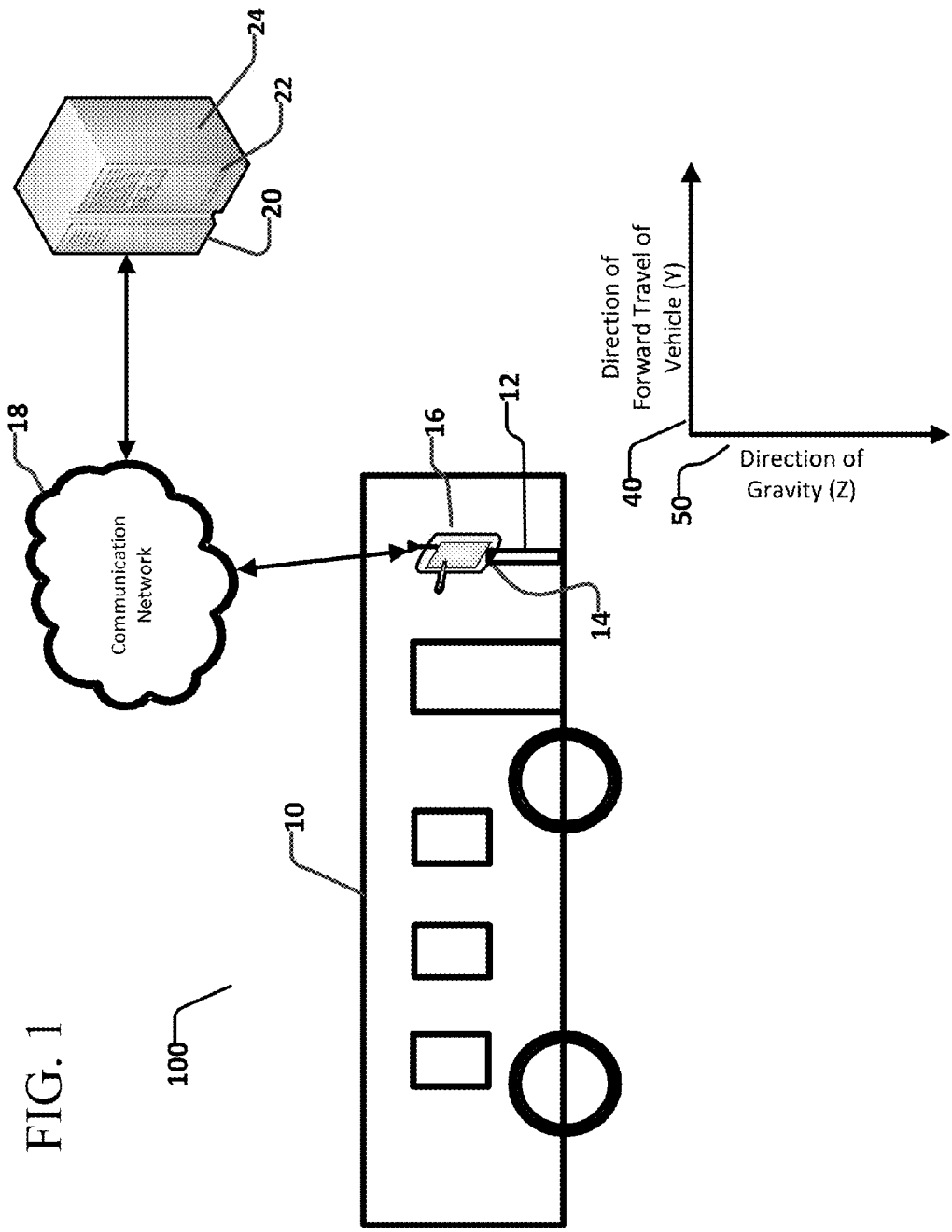
FIG. 1 shows a system for adjustable position accelerometers direction determination according to an embodiment of the invention.

FIG. 1 shows a system 100 for adjustable position accelerometers direction determination comprising vehicle 10, further comprising mobile data terminal (MDT) 16, mounting brace 12 and adjustable mount 14, communication network 18, transit control center ("TCC") 20 which may further comprise transit software 24 and database 26, and vehicle axes Y 30 and Z 40.

Vehicle 14 is a vehicle that provides, or relates to the provision of, transit services. Vehicle 14 may be a normal car or van, or may be somewhat more specialized such as a bus, ATV, or piece of equipment. Vehicle 14 may be used by more than one driver, or by one or more drivers having one or more MDTs. In one particular embodiment, vehicle 14 may be a car in a fleet of cars owned by a corporation and used by renters or employees while in another vehicle 14 may be a public transit bus.

Vehicle 14 may have three axes with respect to itself and its direction of travel: an X axis (which may be a lateral direction across the vehicle), a Y axis 30 (which may be a direction of travel of the vehicle, forward and backward, and longitudinal to the vehicle) and a Z axis 40 (vertical axis). Of course it is to be understood that X, Y and Z are interchangeable and simply nomenclature for the directions, though the present application will often refer to a forward/backward axis, an up/down axis and a lateral (left/right) axis.

Vehicle 14 comprises MDT 16 thereon or therein, though possibly being removable therefrom. MDT 16 may be removably attached to mounting brace 12 via adjustable mount 14. In use, a driver may enter vehicle 10 and desire to connect the MDT 16 they have to vehicle 10. They may then insert or connect MDT 16 to mounting brace 12 via adjustable mount 14. Mounting brace 12 may be substantially any object capable of supporting adjustable mount 14 and MDT 16. Adjustable mount 14 may be substantially any object capable of attaching to MDT 16, and may allow movement (including movement and re-orientation of MDT 16) in one or more planes, and possibly in all three planes. It is to be understood by those of skill in the art that many combinations of mounting brace 12 and adjustable mount 14 are considered within the scope of the present invention. In one embodiment MDT 16 may be a tablet, and mounting brace 12 and adjustable mount 14 may be one of several commercially available tablet holders that can swivel and/or pivot.

MDT 16 may be computing devices that may take user input (such as keystrokes, clicks, touch inputs, and the like) and provides the user interface to functionality relating to, for example, the provision of transit services, driver or vehicle evaluation, and acceleration monitoring, and interacting with TCC (though it will be appreciated that MDT 16 need not have any user interface or user input components) and the software located thereon (such as transit software 24). MDT 16 may have software running thereon to accept inputs as described herein, provide outputs as described herein, and communicate with other elements of system 100 as described herein. MDT 16 may have features of many tablets, smartphones, rugged PCs, and the like, such as one or more screens, memory, processors, cameras, communication modules (Bluetooth, RFID, cellular, WiFi, NFC, etc), and user inputs (touchscreens, buttons, etc).

MDT 16 may have an accelerometer 70 operably connected or embedded therein that can record acceleration of MDT 16 (and hence vehicle 10) along one or more axes, such as along axis X(a) 30a, Y(a) 40a and Z(a) 50a, as described herein. An exemplary accelerometer may be LIS3LV02DL from STMicroelectronics™. Accelerometer 70 may provide either filtered or unfiltered acceleration data and values. Unfiltered may be exactly what accelerometer 70 is experiencing, while filtered may be data where the effects of gravity have been removed. Filtering may be via a high pass filter used to remove this 1 g force from accelerometer measurements as this 1 g force is constant. Therefore, the portion of software 24 that interacts with accelerometer 70 assumes that whatever hardware it reads from has already removed this 1 g force from its measurements for filtered data readings. As used herein, accelerometer "readings" are meant to be data used for monitoring, assessing, and the like, while accelerometer "values" are meant to be data used for direction tuning. In practice they are often the same data, but are referred to separately for simplicity.

MDT 16 may be able to communicate with other elements of system 100 (such as vehicle 14 and MDT 16), for example by communication network 18, or directly such as may be the case with other systems of vehicle 14. One exemplary MDT 16 may be Ranger 4™, made by Trapeze Software™.

Transit control center 20 may be a system for operating one or more transit services, fleet of vehicles 14 (such as by a fleet operator), or the like. TCC may be implemented via one or more software components, and may be used by one or more transit agencies or fleet operators. Transit control center 20 may further comprise fleet software 24 and database 22, which may provide the logic and storage to implement other features of software as required herein, such as to communicate acceleration and other data (such as driver evaluation data) with vehicle 10. Transit control center 20 may communicate, via communication network 18, with vehicle 14 and MDT 16, as needed, to implement the functionality described herein.

Communication network 18 may be substantially any public or private network, wired or wireless, and may be substantially comprised of one or more networks that may be able to facilitate communication between themselves. Communication network 18 may facilitate various types of communication, such as cellular, WiFi, and the like, or it may not be required as elements of system 100 may communicate directly between themselves.

Figure 2:
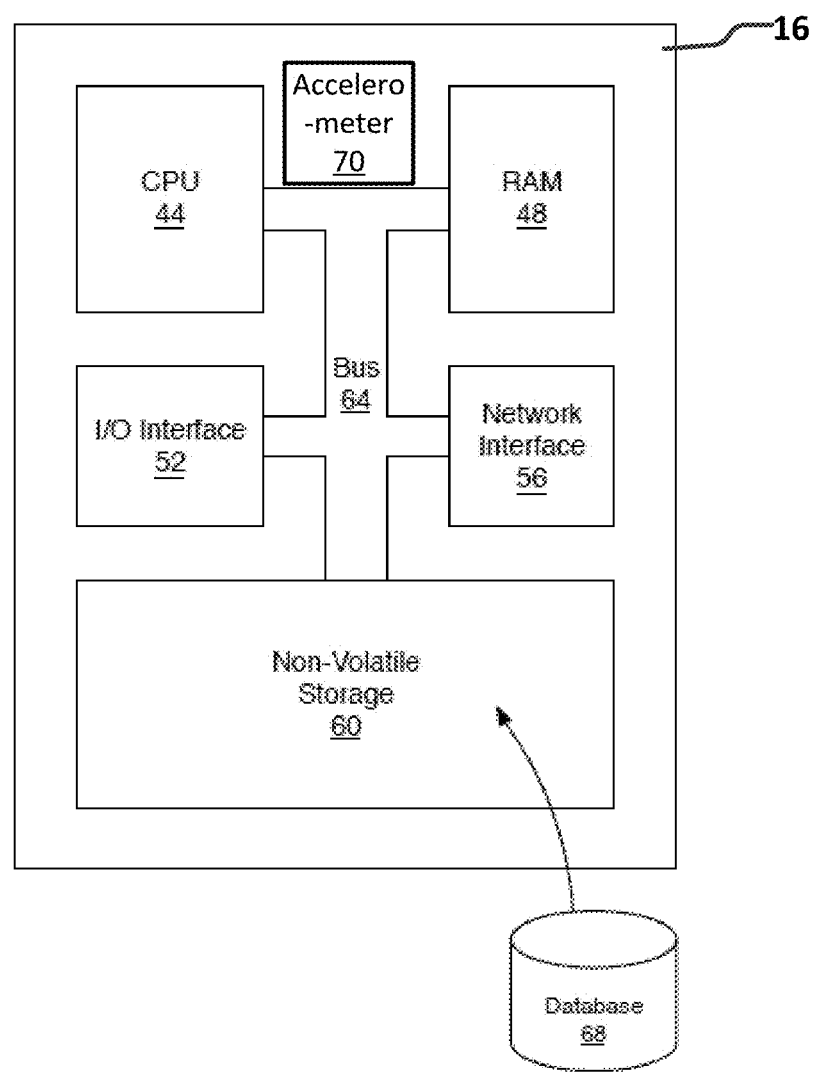
FIG. 2 shows a number of components of an MDT according to an embodiment of the invention.

FIG. 2 shows a number of components of MDT 16 in FIG. 1 (which may also be substantially similar to components of TCC 20). As shown, MDT 16 has a number of components, including a central processing unit ("CPU") 44 (also referred to simply as a "processor"), random access memory ("RAM") 48, an input/output interface 52, a network interface 56, non-volatile storage 60, accelerometer 70, and a local bus 64 enabling the CPU 44 to communicate with the other components. The CPU 44 executes an operating system and programs that provide the desired functionality. RAM 48 provides relatively-responsive volatile storage to the CPU 44. The input/output interface 52 allows for input to be received or provided from one or more devices, such as a keyboard, a mouse, a touchscreen, etc., and enables the CPU 44 to present output to a user via a monitor, a speaker, a screen, etc. The network interface 56 permits communication with other systems for receiving itinerary planning requests and for providing itinerary responses, in the form of web pages. Non-volatile storage 60 stores the operating system and programs, including computer-executable instructions for itinerary planning. During operation of MDT 16 (or TCC 12), the operating system, the programs and the data may be retrieved from the non-volatile storage 60 and placed in RAM 48 to facilitate execution.

Figure 3:
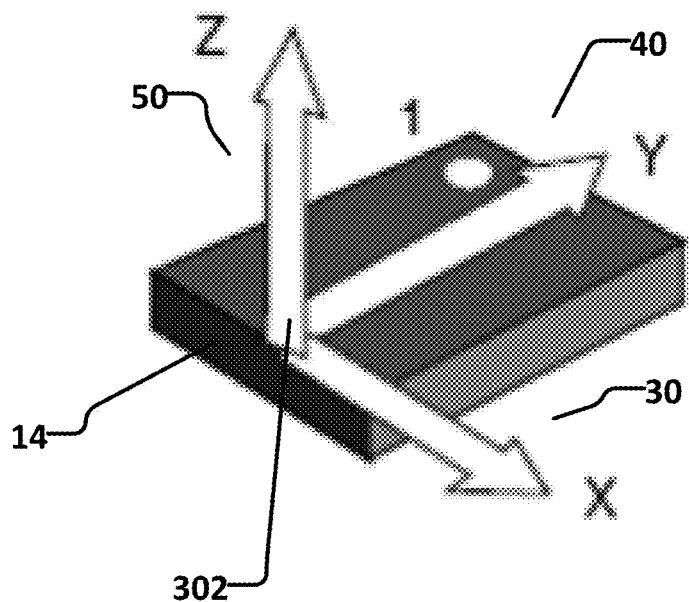
FIG. 3 shows the relationship between vehicle axes for vehicle and accelerometer axes for accelerometer according to an embodiment of the invention.
Figure 3:
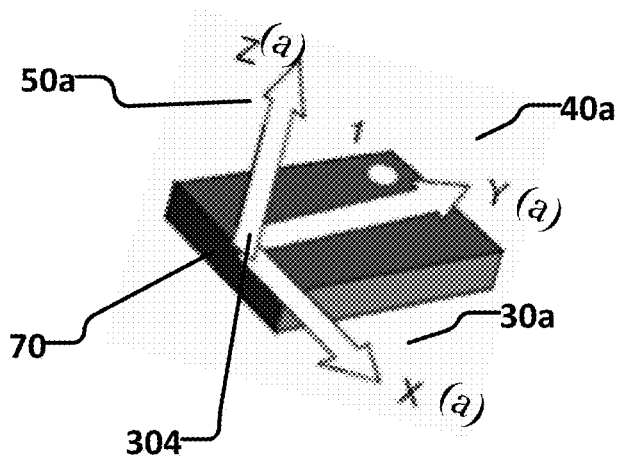

FIG. 3 shows the relationship between the vehicle axes 302 for vehicle 14 and accelerometer axes 304 for accelerometer 70. FIG. 3 is not to scale and is not intended to show mounting of MDT 16 or how accelerometer 70 is embedded therein.

Vehicle axes 302 are made up of X 30, Y 40 and Z 50, representing the directions of lateral (left/right), longitudinal (forward/backward) and vertical (up/down) respectively, of vehicle 14.

Accelerometer axes 304 are made up of X(a) 30, Y(a) 40 and Z(a) 50, representing the directions of lateral (left/right), longitudinal (forward/backward) and vertical (up/down) respectively, of accelerometer 70.

As shown in FIG. 3, accelerometer axes 302 are not coaxial with vehicle axes 304. Thus when vehicle 14 is accelerating in a strictly forward direction (+Y acceleration), accelerometer 70 may be experiencing +Y(a)/−X(a)/+Z(a) acceleration. This +Y(a)/−X(a)/+Z(a) acceleration needs to be determined.

Figure 4:
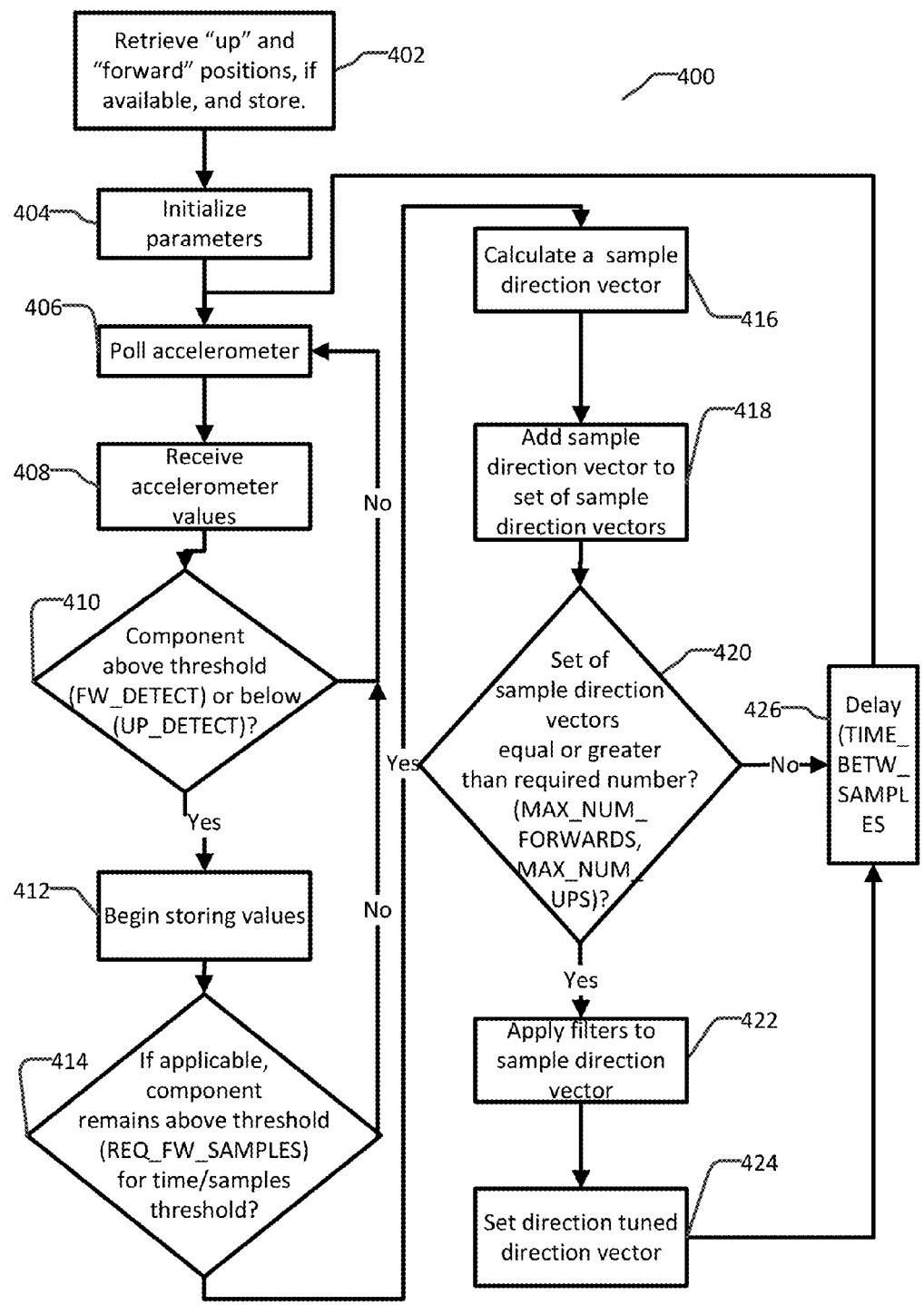
FIG. 4 shows a method for determining directions of a vehicles' travel using an adjustable position accelerometer.

FIG. 4 shows a method 400 for determining directions of a vehicles' travel using an adjustable position accelerometer. Method 400 seeks to ensure that accelerations measured by accelerometer 70 (and obtained by MDT 16) that lead to directions of vehicle 14 reflect and correspond (or are coaxial) to the actual directions of travel of vehicle 14, and so that acceleration monitoring accurately describe the driving conditions of vehicle 14. This is accomplished by ensuring that the vectors of [X(a), Y(a), Z(a)] representing "up", "forward" and "right" (for example – such being direction tuned direction vectors) correspond properly to vectors of [X,Y,Z] representing "up", "forward" and "right" (for example). Method 400 may be initiated based on triggers (for example that indicate that directions are not set, such as the DIRECTION_TUNED flag) or may largely run during operation, such that additional sample direction vectors are continuously added and averaged together.

Many factors can cause the axes to not be coaxial, such as:
1. Initial placement of MDT 16 in non-coaxial configuration.
2. Rotation/tilting of MDT 16
3. MDT 16 is moved by the driver and it has not had enough time to re-calibrate in accordance with embodiments of the present invention;
    a. This could be because a new driver, of a different height, has started driving;
    b. A new route, vehicle or passenger profile (numbers, locations, sizes, weights, etc) require MDT 16 to be moved;
4. Bumps in the road cause the "noise" signal from the accelerometer to not reflect, or obfuscate, what is really being experienced on/by vehicle 14;
5. Acceleration while cornering skews the "forward" result. This effect may be filtered out or minimized via a minimum number of samples to establish the forward direction. For example, if a driver continuously accelerated and slowed down in a circle, the process would inaccurately determine the forward vectors. However, because the system is continuously running the calibration process, the inaccuracy would be averaged out of the system when the vehicle was driven in more 'normal' conditions.
6. Hardware designers may re-orient accelerometer 70 in MDT 16.

Method 400 determines which direction is "forward" by detecting sustained accelerations. If an acceleration along one axis is non-zero (and possibly requiring it to exceed a threshold) for several seconds, the direction of this acceleration is considered "forward". The number of seconds used to determine this number may be, for example, the same number of seconds it generally may take vehicle 14 to accelerate from 0 to 50 km/h. For some accelerometers 70, testing showed that it was easier to determine "backward" by detecting braking rather than forward. As a result, the "forward" vector may be found by determining "backward" and multiplying the backward vector by −1.

Method 400 begins at 402 where MDT 16 retrieves the previous "up" and "forward" directions, for example from database 68 on MDT 16 or from TCC 20. Although the previous "up" and "forward" directions may no longer be accurate, they may be retrieved to provide a starting point. At such time, the DIRECTION_TUNED flag may be set to "true" or "false" depending on the situation. For example, if MDT 16 is newly on vehicle 14, or a new driver logs into MDT 16 on startup then the DIRECTION_TUNED flag may be set to "false".

At 404 parameters and keys are initialized. This may be accomplished, for example, by software 24 on MDT 16 retrieving a file or data in database 68 to determine the previous calibration parameters determined by the accelerometer driver. Calibration parameters may include counts, thresholds, delay timers, and the like while keys may include counters and values that may largely be collected and stored during operation, and may include:

| Parameter | Value | Details |
| --- | --- | --- |
| REQUIRED_FORWARD_SAMPLES | 40 | This parameter is the number of samples (or length of time, such as a collection period) an acceleration along one axis must be large before "forward" is detected. When sampling an accelerometer 5 times per second, this corresponds to 8 seconds. It was found that the larger this number was the more accurate the "forward" became. However, if this |

-continued

| Parameter | Value | Details |
|---|---|---|
| | | number is too large then it takes much longer to collect "forward" vectors, and therefore longer to redetermine "forward" if the orientation of the accelerometer changes. This value may be set to equate to the time it takes vehicle 14 to go from 0 km/h to 50 km/h. |
| FW_DETECT | 25000 | The value in micro-gs that one axis must be above for the number of samples given in REQUIRED_FORWARD_SAMPLES before we consider this vector "forward". |
| UP_DETECT | 20000 | The value in micro-gs that all axis' must be below before we consider the vehicle to be at rest. At this point we read the 1 g force due to gravity and from this determine "up". |
| MAX_NUM_FORWARDS | 20 | The number of forward vectors averaged together. This number of vectors is collected after 20 to 30 minutes of driving. |
| MAX_NUM_UPS | 200 | The number of up vectors averaged together. This number of samples can be collected after only 2 minutes of driving. |
| TIME_BETWEEN_SAMPLES | 200 | Sample frequency. It was found that accurate forward and down vectors can be determined at this frequency, while keeping device CPU utilization low (between 0 and 1% on a debug image). |
| DIRECTION_TUNED | Boolean | Value is "yes" if the relationship between X, Y, Z of vehicle 14 and X(a), Y(a), Z(a) has been confirmed (ie that direction vectors for one or more of "up" and "forward" have been found for X(a), Y(a), Z(a)). If not, the value is "no" which means a lack of confidence of a confirmed relationship. Value may be reset to "no" based on vehicle 14 restart, replacement/removal of MDT 16, a new driver logging into MDT 16, etc. |

| Key | To Collect | Details |
|---|---|---|
| UpCount | To Collect | Number of up accelerations accumulated. Maximum is 200. |
| UpXTotal | To Collect | X component of the accumulated up samples (micro-gs) |
| UpYTotal | To Collect | Y component of the accumulated up samples (micro-gs) |
| UpZTotal | To Collect | Z component of the accumulated up samples (micro-gs) |
| ForwardCount | To Collect | Number of forward accelerations accumulated. Max may be 20. |
| ForwardXTotal | To Collect | X component of the accumulated forward samples (micro-gs). |
| ForwardYTotal | To Collect | Y component of the accumulated forward samples (micro-gs). |
| ForwardZTotal | To Collect | Z component of the accumulated forward samples (micro-gs). |

At 406 a thread is started on MDT 16 (using processor 44) that polls the accelerometer at a particular frequency as specified by the parameters. This thread is used to continuously refine the forward and up directions and to detect large accelerations. Method 400 may be stopped but preferably is not stopped during operation of vehicle 14 so that proper acceleration values are always kept. Also, polling frequency may be adjusted, for example based on speeds, vehicle types, drivers, streets to be driven, and the like.

Continuing on, at 408 values (or components thereof, such as X(a),Y(a),Z(a) components) are received from accelerometer 70 and at 410 those values are compared to thresholds (such as FW_DETECT and/or UP_DETECT). This is to determine whether vehicle 14 is experiencing acceleration that indicates it actually is in motion (or sufficiently not in motion) that will allow accurate determination of a given direction. There may be a threshold for each direction that may all be different. Additionally, for "up" determination, the threshold may be an upper limit (so that acceleration cannot exceed the threshold) so that the "up" direction can be determined while vehicle 14 is at rest (hence reducing the chances of, for example bumps, causing inaccurate "up" determination). Also at 408, values received from accelerometer 70 may be stored, for example in storage 60 for later use. Such samples may be stored and kept for a period of time, for example the most recent 5 minutes of samples may always be kept. Such samples may be requested and/or used when severe accelerations are experienced (which may indicate a crash or evasive/aggressive driving).

At 412 if at least one of the components has exceeded its threshold, indicating a scenario where it is likely useful to determine direction, then at 412 those values are stored. This is not to suggest that values received at 408 may not be stored, rather just that those values at 408 are not yet considered to be useful in starting to determine direction. Exceeding of thresholds may be one example (and an automatic trigger, in that no manual intervention is required and the software may proceed on its own) of a trigger that indicates a vehicle is moving in a particular direction, meaning that a direction tuned direction vector may be able to be calculated. Other triggers, both manual and automatic are possible. For example, a driver of vehicle 10 may be able to provide a signal (touching MDT 16 or another peripheral, providing an auditory signal, or another form), for example when the driver knows they are driving (straight) forward, are on a straight road, accelerating along a straight road, and the like.

As values are being stored at 412, the component(s) that exceeded the threshold are continuously monitored to ensure they exceed the threshold for the entire period required for a valid direction determination (that being the REQ_FW_SAMPLES or an equivalent for "up").

If either there are no components that trigger the right threshold at 410, or those components do not continue to trigger the threshold long enough at 414 then a direction is not determined from that sampling and method 400 returns to 406 to continue polling.

Continuing from 414, if the required number of samples have been collected then method 400 continues to 416 where a direction vector is calculated. This may be done, for example, by summing all X components from the collected samples, all Y components from the collected samples, and all Z components from the collected samples, and then calculating an average. This results in an average X(a), Y(a), Z(a) vector ("AvgAccelVector") for the acceleration experienced. Assuming a forward acceleration of vehicle 14, the resulting AvgAccelVector would then indicate what components of its acceleration constituted acceleration in the forward direction of vehicle 14. Such AvgAccelVector represents one calculation of what the vehicle's forward (or other direction) vector is in terms of the accelerometer's components.

It is to be understood that calculating may further involve other operations, such as multiplying each component by −1 in the case where braking is used to determine direction.

At 418 the AvgAccelVector is added to a set of such vectors. The set of vectors would thus grow by one (Up-Count or ForwardCount would be increased by one, for example).

At 420 the size of the set of vectors (such as via UpCount or ForwardCount) is compared to the number required to determine the vector to be used for the direction. The number may be set in the MAX_NUM_FORWARDS and MAX_NUM_UPS parameters.

At 422 filters may be applied to "clean up" data. Applying filters may be at the level of the calculated averages or at the level of the underlying data. Exemplary filters may include:
1) Removing "noise" caused by bumps such as may be done to remove Z(a) acceleration in
FIG. 6, which may substantially be accomplished simply by removing the acceleration components determined to be components of vertical acceleration and/or by averaging a minimum number of samples (MAX_NUM_FORWARDS for example) prior to establishing direction vectors;
2) Removing samples with large Y(a) components, assuming X(a) is mainly "forward", provided the entire sample was removed (and not just setting the Y(a) component to zero);
3) Requiring a minimum number of samples prior to establishing a direction, for example to filter out samples where acceleration occurred while cornering or other atypical driving activities;
4) Removing acceleration caused by drivers making adjustments to MDT 16, such filters including:
   a. Filter any acceleration based events when the ignition is OFF;
   b. Filter any acceleration based events that occur from the time that IGN goes ON until the first motion is detected;
   c. Filter any acceleration when the vehicle is not in motion. However this would potentially prevent the detection of hard acceleration or cornering from a stopped position (i.e. off of a stop light) so may this filter may not be used.

Figure 5:
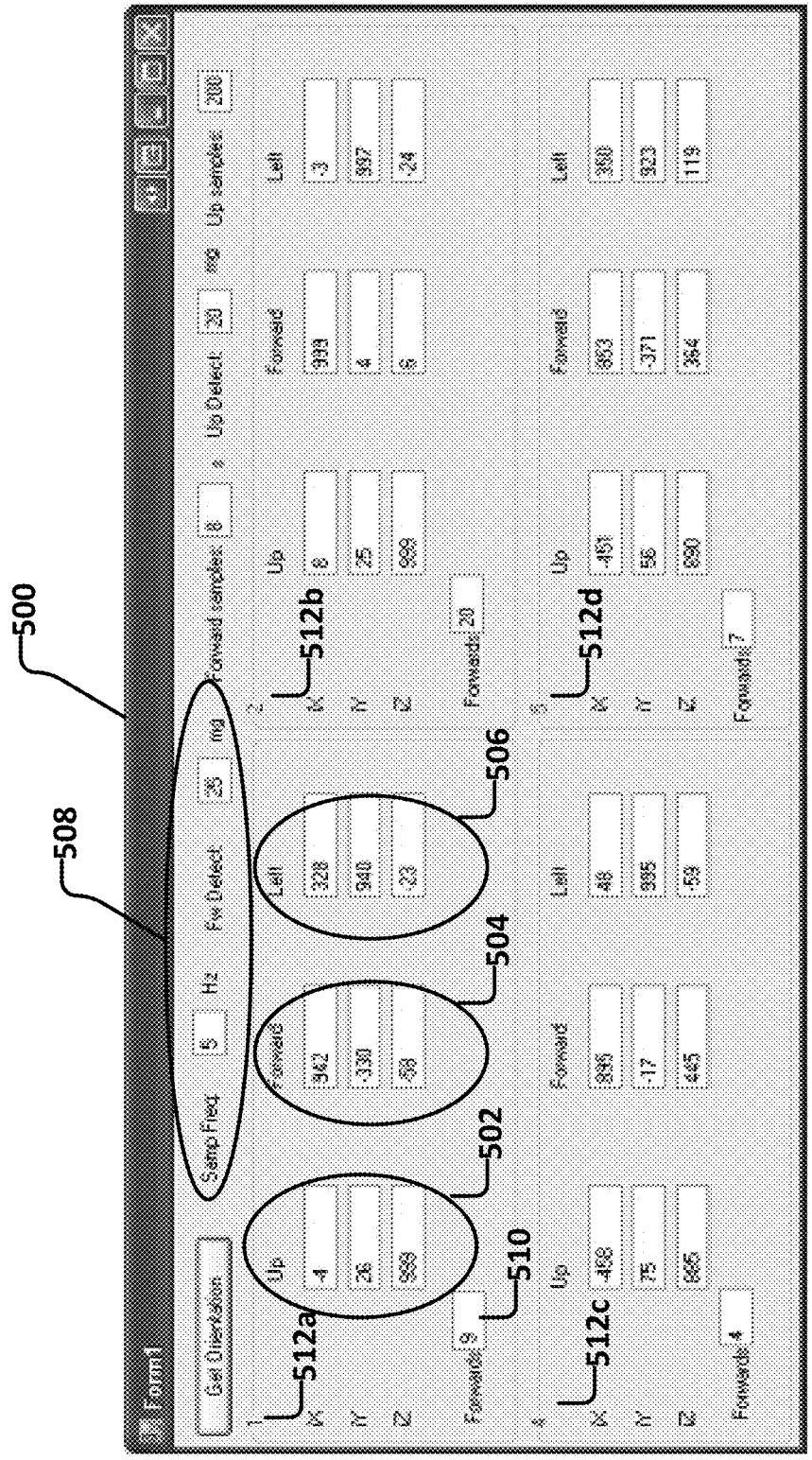
FIG. 5 shows a screen showing testing results for determining directions of a vehicles' travel using an adjustable position accelerometer according to an embodiment of the invention.

If the size of the set of vectors is larger than the required number (optionally after filtering in 422), the direction vector is set at 424 by averaging the collected samples for each axis and calculating a unit vector that represents the x, y and z components of the forward direction (DirectionTunedForwardVector, which may be one of the direction tuned direction vectors for vehicle 14). For example, in a scenario where the forward direction was entirely aligned along the x axis, the unit vector for the forward direction would be [1,0,0] and the unit vector for the left direction would be [0,−1,0]. In a typical example (as shown in FIG. 5), the unit vector would be comprised of components in all 3 dimensions as per 512a where the forward direction is represented as [0.942, −0.330, −0.058] (noting that the values shown in FIG. 5 are in milli-g). As described herein, the averaging process has the effect of filtering undesirable data and provides an accurate estimate of the direction of travel. The DIRECTION_TUNED flag may be set to signal that system now has sufficient data to evaluate harsh acceleration, deceleration and cornering events. Once the initial direction has been established, the direction of travel is continuously sampled and refined to account for device orientation changes, as described herein, though further acceleration values may be collected, stored, analyzed and sent to interested parties.

As discussed herein, the number of vectors for a set can be set dynamically and depends on various factors. Where greater accuracy is desired, the set can be forced to be larger, the trade-off being increased time to determine forwards (and hence more time operating vehicle 14 while the direction is not set). This larger set can smooth out, or reduce the impact of anomalies (such as acceleration during a long turn).

After the direction is set, or the set of vectors is not large enough to set the direction at 420, method 400 continues to 426 where a time delay occurs before the next sampling begins. Of course such delay may be zero (and polling may re-start right away) or there may be a delay, for example to ease processing requirements. If the set of vectors is not yet large enough method 400 may desire additional samples/vectors and so may not incorporate a delay. If direction has been established, method 400 may maintain a continuous rolling average of samples wherein new samples that meet the defined criteria replace the oldest sample (or simply be added to all other samples) and are used to refine the directional unit vectors.

Measuring "Up"

Accelerometers will always detect a 1 g force due to gravity. Therefore, accelerometer readings will indicate 1 g force upwards (against gravity). These readings would be a problem because the orientation of MDT 16 vehicle 14 is not always known or even constant. This force will always show up in the "up" direction. Where MDT 16 is mounted horizontally in a vehicle and accelerometer 70 is installed so that its Z axis is pointed up, then readings when vehicle 14 is at rest will indicate 0 g on the Y and X axes and +1 g on the Z axis. However, if the accelerometer is not installed in a vehicle in this exact way the 1 g force due to gravity will show up in a combination of X, Y and Z axis'. This is a problem because even if a vehicle is at rest the accelerometer will indicate a 1 g acceleration, which is quite large.

To overcome this issue a high pass filter featured by some accelerometers, including the LIS3LV02DL, is used to remove this 1 g force from accelerometer measurements. Since this 1 g force is constant, it will be filtered out by the high pass filter. Therefore, the portion of software 24 that interacts with accelerometer 70 assumes that whatever hardware it reads from has already removed this 1 g force from its measurements.

However, if the orientation of the accelerometer changes quickly the 1 g force due to gravity will briefly show up on a combination of X, Y and Z axis' and must be accounted for.

Method 400 may determine which direction is "up" by measuring the force due to gravity using the filtered and unfiltered readings from accelerometer 70. This may be done one or more times, and method 400 may ensure that there are intervening acceleration events (where acceleration exceeds a threshold, or exceeds a threshold for a set amount of time, for example) between the "up" samples to ensure that all of the samples are not taken when a vehicle is parked on an incline. When vehicle 14 is at rest (ie. the filtered measurement returned by the accelerometer is close to zero, or lower than a UP_DETECT threshold for example) the force due to gravity can be obtained by reading the unfiltered acceleration from the accelerometer (hence both types of values may be received at 408). Provided vehicle 14 remains at rest then adequate samples may be obtained and a minimal set of "up" vectors may quickly be obtained. If the resultant vector is not substantially entirely along one axis then vehicle 14 may be on a hill, oriented at a particular angle, accelerometer 70 may be installed at an angle in MDT 16, or another cause, in which case a larger set of vectors may be desirable, though recalculation (after a time delay at 426 may well quickly and easily correct for such hill).

Accuracy

The accuracy with which this driver can properly detect a large acceleration and in which direction the large acceleration happened improves with time. After a maximum of 30 minutes of driving, this resource class will know enough determine the magnitude and direction of accelerations correctly most (more than 90%) of the time. It may thus be desirable to set the parameters to allow roughly 30 minutes of driving so that the confidence is high. Allowing longer than 30 minutes may result in greater than 90% but may increase the time where lower confidence exists. Allowing shorter than 30 minutes may result in less than 90% but may reduce the time where lower confidence exists. This is only the first time the device is used. On subsequent uses this resource class will be this accurate at device boot up.

When a device with the accelerometer driver is installed in a vehicle and used the first time it will take approximately 2 minutes for the software to accurately determine which directions are down and up, and anywhere from 5 to 30 minutes to accurately determine which directions are right, left, forward and backward, depending on the parameters set and other driving and driver related factors. These directions are stored in storage 60 so that these directions are known on MDT 16 boot up in subsequent uses of the device, as described herein.

FIG. 5 is a screen 500 showing testing results for determining directions of a vehicles' travel using an adjustable position accelerometer.

Various testing was done, with FIG. 5 demonstrating results of some of such testing. The final "Up" vector 502, "Forward" vector 504 and "Left" vector 506 after the trips are shown. The adjustable parameters 508 are along the top. The number of forward vectors collected are beside each "Forwards" label 510.

In the example tests shown, #2 512b has the most accurate forward which was obtained in 20 minutes. It also has the most number of forward vectors collected (20). The up vectors for all tests are fairly accurate.

In practice, once the direction calibration has been completed and a unit vector (or direction tuned direction vector) has been calculated for the forward direction, such as "Forward" vector 504, (and other directions as desired/required, such as "Up" vector 502), each further acceleration sample vector may be evaluated to identify significant acceleration, deceleration and cornering events to see whether one or more thresholds, policies or rules have been violated, and for example indicating that the values should be provided or communicated (for example to agency) for further analysis. For example, an agency may have a policy wherein they wish to be notified for braking events that exceed 1.0 g (i.e. outside the normal range for a typical car). For example:

Calculated Forward Unit Vector (per FIG. 5 512c) is [0.895,−0.017,0.445].

An accelerometer data sample of [−1.1, 0.020,0.480] is detected.

The dot product of the Unit Vector and Accelerometer sample is calculated to determine a scalar magnitude in the forward direction:

[0.895,−0.017,0.445]·[−1.1,0.020,−0.480]=(0.895*−1.1)+(−0.017*0.020)+(0.445*−0.480)=(−0.985)+(−0.003)+(−0.214)=−1.202

Since −1.202 exceeds the specified braking threshold, a report would be generated.

Similar examples can be conceptualized for cornering and accelerating.

Of course an agency may establish any number of policies or rules for when acceleration should be reported. It may be preferable for proper direction vectors to have already been established (as described herein) for the policies and rules to be accurately monitored and followed. Exemplary rules may include:

1. Exceeding a threshold for acceleration in one or more directions;
2. In one application of the use of the "Up" acceleration vector, road disturbances, for example pot holes, may be recorded. This may be accomplished by determining an "Up" acceleration threshold that indicates a problem on the road (noting that the threshold may vary based on speed, vehicle type, temperature, tire pressure and size, weight, and the like). Then speed, location (for example GPS coordinate), Vehicle Identification Number (VIN—which provides sufficient information to evaluate the type of vehicle when post processing the data, for example if MDT 16 does not have access to the vehicle bus, such as the OBDII bus) and acceleration magnitude information associated with up/down events that exceed the specified threshold could be either continuously recorded on the device for later upload, or reported in real time. Map or geographic databases may be used to filter out known sources of "legitimate" bumps—speed bumps, railroad tracks, etc. The resultant disturbances, after filtering, may indicate that a city needs to send a road crew. Monitoring and observing a certain number of "Up" accelerations over a certain time may increase the confidence that work is required, or expedite the work (such as if each public transit bus on a route experiences a disturbance at roughly the same location);
3. Exceeding a certain number of thresholds in a certain amount of time;
4. Reporting acceleration values at a pre-determined frequency;
5. Reporting when the DIRECTION_TUNED flag has been set.

Figure 6:
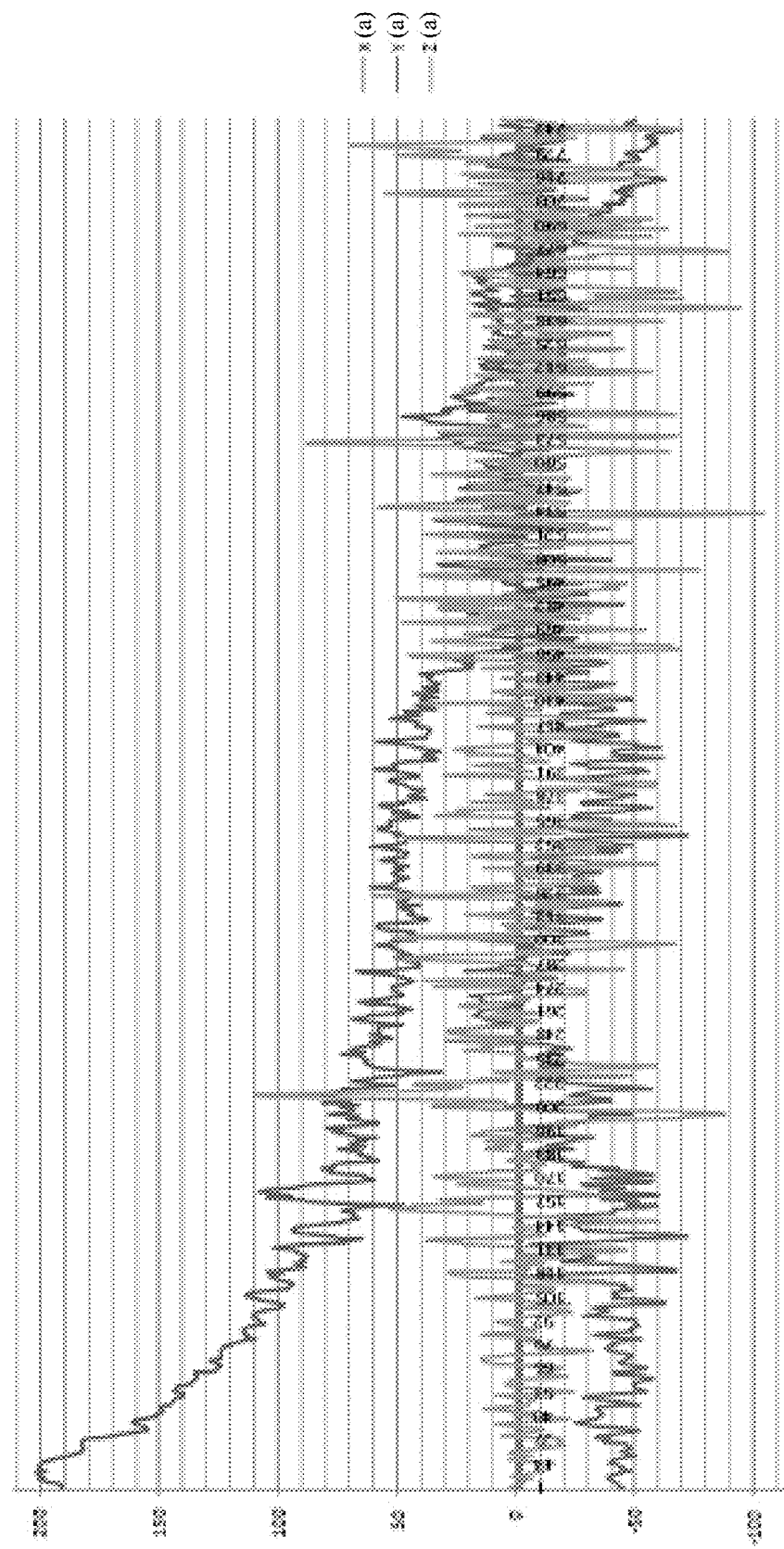
FIG. 6 shows a graph of X(a), Y(a) and Z(a) data read from an accelerometer when a vehicle accelerated from 0 to 50 km/h.

FIG. 6 is a graph of X(a), Y(a) and Z(a) data read from an accelerometer 70 when a vehicle 14 accelerated from 0 to 50 km/h. Accelerometer 70 was mounted in vehicle 14 such that a positive Y value indicated forward. The vertical axis units of the graph are in milli-gravities (or milli-gs), and the horizontal-axis units of the graph are the number of samples collected. Samples were collected at 40 Hz (the lowest sampling rate of LIS3LV02DL, the accelerometer that was used). In FIG. 6, the acceleration of the Y(a) axis was above 25 milli-gs for just over 10 seconds. The data for all 3 accelerometer axis readings show a lot of noise due to car vibrations. Accelerations along the Z(a)-axis (up and down axis in this example) show the largest amount of noise due to bumps in the road.

Figure 7:
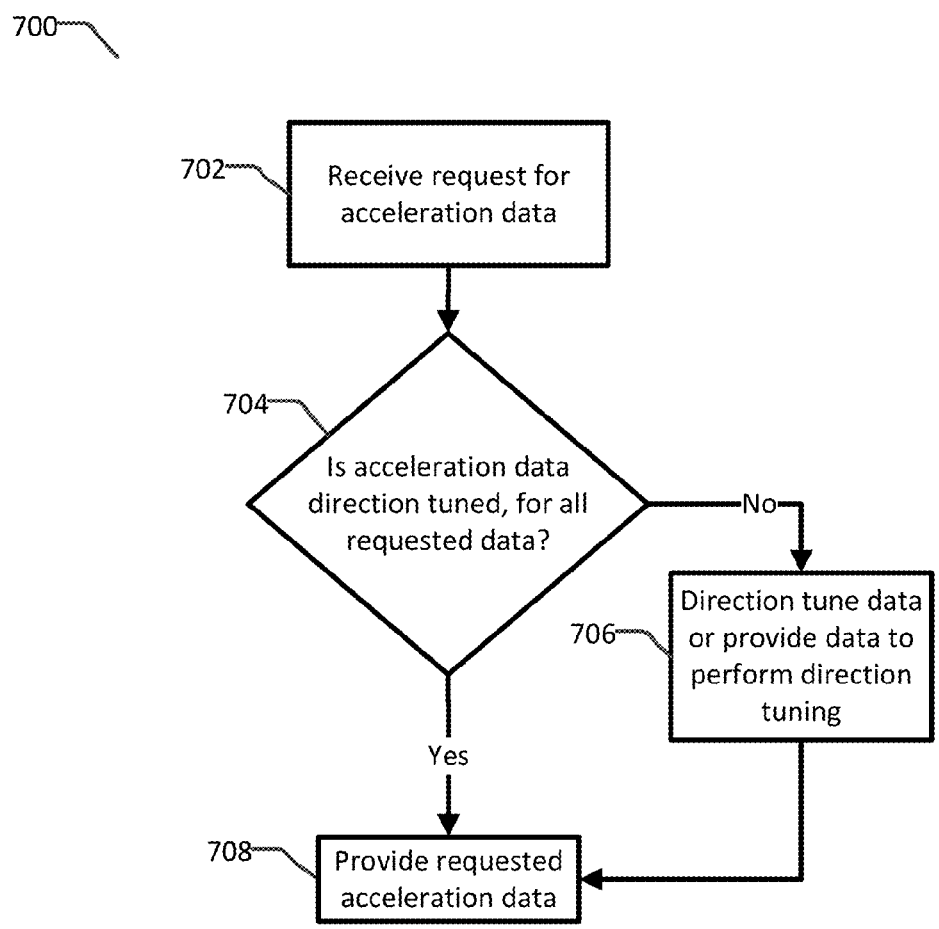
FIG. 7 shows a method for providing acceleration data from an adjustable position accelerometer according to an embodiment of the invention.

FIG. 7 shows a method 700 for providing acceleration data from an adjustable position accelerometer according to an embodiment of the invention.

Acceleration data can be used for a variety of reasons, such as: driver evaluation, vehicle monitoring, vehicle evaluation, vehicle comparison, route comparison, and the like.

Acceleration data can be requested by a variety of entities including transit agencies, fleet operators, monitoring companies, and the like. Request made be made in many ways, but one exemplary way may be via TCC 20 communicating with MDT 16 over communication network 18. Of course, it is to be understood that entities (such as TCC 20) may request such data, or acceleration data may be "pushed" to TCC 20 from MDT 16. The end-requester may be another computing device (cell phone, tablet, laptop, PC, etc—not shown) that may get the data from TCC 20 or directly from MDT 16 via communication network 18.

These requests or pushes may be continuous (regular communication or a continuous connection), scheduled (ie every 1 minute) or event-driven (ie when MDT 16 records a large acceleration value, or when TCC 20 notes a general disturbance and wishes to retrieve information). Requests may also be real-time (ie provide your current acceleration data), historic (ie provide your acceleration data from 1 hour ago), or forward-looking (ie provide your acceleration data in 3 minutes, or when you reach particular GPS coordinates).

Regardless of the nature of the request and requester, if the data may not be reliable the users of the acceleration data should be made aware of this.

Method 700 begins at 702 where a request for acceleration data is made.

At 704 a determination is made, or checking occurs, whether the requested acceleration data is direction tuned. "Direction tuned" may mean that the [X(a),Y(a),Z(a)] vector existed, with some confidence, for at least direction of vehicle 14 at the time the acceleration was collected or is to be collected from vehicle 14, or some other proxy that the acceleration data is reliable (and thus that components of [X(a),Y(a),Z(a)] from accelerometer 70 that represent forward, for example, are known with some certainty). One way of indicating this may be to check the value of the DIRECTION_TUNED flag at the time of collection of the acceleration data. Of course if the requested data is real-time or future data then an indication (such as a flag or even the Boolean value of DIRECTION_TUNED) may be sent with the acceleration data.

If the requested data has been direction tuned then it may be sent to the requester at 708. Otherwise it may be direction tuned before sending or direction tuning data may be sent along with the requested data to allow the requesting party to direction tune (such as the best guess for the X(a),Y(a),Z(a) vector, the set of direction vectors collected within a certain amount of time from the acceleration data, the currently stored direction, or the like—substantially any data that may help in properly interpreting the acceleration data).

It is beyond the scope of the present invention to describe all the different approaches to sending data, including communication means and methods, reliability, security, underlying technologies, and the like. It is to be understood that a person of skill in the art would know a variety of ways to communicate data from MDT 16 to TCC 20 (or other data sinks).

It is to be understood that the screenshots, methods, and functionality described herein may be implemented on TCC 20, MDT 16 or other computing device and may be displayed on TCC 20, MDT 16, or any other computing device that an agency may allow to interact with TCC 20. Many variations thereon are considered within the scope of the present invention.

Computer-executable instructions for implementing the functionality and software, on a computer system could be provided separately from the computer system, for example, on a computer-readable medium (such as, for example, an optical disk, a hard disk, a USB drive or a media card—which may replace or complement storage 60 or RAM 48) or by making them available for downloading over a communications network, such as the Internet.

While the computer system is shown as a single physical computer, it will be appreciated that the computer system can include two or more physical computers in communication with each other. Accordingly, while the embodiment shows the various components of system 100, and TCC 20 residing on the same physical computer, those skilled in the art will appreciate that the components can reside on separate physical computers.

The above-described embodiments are intended to be examples of the present invention and alterations and modifications may be effected thereto, by those of skill in the art, without departing from the scope of the invention that is defined solely by the claims appended hereto.

What is claimed is:

1. A method comprising:
    collecting an accelerometer value from an arbitrarily mounted, adjustable position and moveable accelerometer in a vehicle, said accelerometer value comprising an X(a) axis component, a Y(a) axis component, and a Z(a) axis component; each of the X(a) axis component, the Y(a) axis component, and the Z(a) axis component may be partially in X,Y, and Z directions of the vehicle, where +Y is a forward direction of the vehicle;
    creating a sample direction vector of values from the collected accelerometer value; and
    calculating, while the vehicle is moving, a direction tuned direction vector for +Y direction comprising an X(a) axis component, a Y(a) axis component, and a Z(a) axis component, from the sample direction vector.

2. The method of claim 1 further comprising:
    collecting a first set of accelerometer values, creating a second set of sample direction vectors from the first set of accelerometer values and calculating the direction tuned direction vector by averaging the sample direction vectors from the second set of sample direction vectors.

3. The method of claim 1 wherein the collecting further comprises:
    receiving a trigger to perform the collecting, the trigger indicating that the vehicle is moving in a +Y or −Y direction.

4. The method of claim 1 wherein the trigger is a manual trigger.

5. A method for determining, for a vehicle using an adjustable position accelerometer, at least one direction tuned direction vector indicating a direction for the vehicle, the direction tuned direction vector made up of an X(a) axis component, a Y(a) axis component, and a Z(a) axis component, the adjustable position accelerometer providing acceleration values, the method comprising:
    monitoring values provided by an arbitrarily mounted, adjustable position and moveable accelerometer; the values made up of an X(a) axis component, a Y(a) axis component, and a Z(a) axis component, where the accelerometer is arbitrarily mounted and movable, in the vehicle such that each of the X(a) axis component, a Y(a) axis component, and a Z(a) axis component may be partially in X,Y, and Z directions of the vehicle, where +Y is a forward direction of the vehicle;
determining, while the vehicle is moving, if at least one of the X(a) axis component, the Y(a) axis component, or the Z(a) axis component exceeds a threshold;
if the threshold is exceeded then:
ensuring the threshold continues to be exceeded during a collection period; and
collecting accelerometer values, at a collection frequency for a collection period;
creating a sample direction vector of values from the collected accelerometer values;
inserting the sample direction vector to a set of sample direction vector; and
calculating at least one direction tuned direction vector from the set of sample direction vectors.

* * * * *